United States Patent [19]

Harrod

[11] Patent Number: 4,988,143
[45] Date of Patent: Jan. 29, 1991

[54] DASHBOARD ASSEMBLY FOR CHILDREN'S RIDE-ON-VEHICLE

[75] Inventor: Lawrence R. Harrod, Fort Wayne, Ind.

[73] Assignee: Kransco, San Francisco, Calif.

[21] Appl. No.: 476,986

[22] Filed: Feb. 8, 1990

[51] Int. Cl.$^5$ ............................................. B62D 25/08
[52] U.S. Cl. .................................. 296/177; 296/901; 280/827
[58] Field of Search .................. 296/177, 901, 185; 280/827

[56] References Cited

U.S. PATENT DOCUMENTS

| | | | |
|---|---|---|---|
| 2,973,220 | 4/1959 | White | 296/901 |
| 2,997,105 | 6/1957 | Douglas et al. | 296/177 X |
| 3,718,344 | 2/1973 | Lohr et al. | 296/177 X |
| 4,361,338 | 11/1982 | Kuchenbecker | 280/827 |
| 4,453,763 | 6/1984 | Richards | 296/185 |
| 4,513,981 | 4/1985 | DeGraaff et al. | 296/177 |
| 4,709,958 | 12/1987 | Harrod | 296/177 |

Primary Examiner—Robert R. Song
Attorney, Agent, or Firm—Kolisch, Hartwell, Dickinson, McCormack & Heuser

[57] ABSTRACT

A dashboard assembly is provided to allow unitary vehicle body construction and to provide a dashboard which extends rearward over a floor pan area of a children's ride-on vehicle. The dashboard assembly, or mounting structure, includes a ledge which is integrally formed and recessed in the vehicle body and includes slots formed therein. An abutment structure is provided and surrounds the ledge and the vehicle body. The dashboard structure is constructed to rest on the ledge and has tangs thereon which are receivable in the slots formed in the ledge and abutment structure. An abutment-contacting structure is located on the dashboard structure and contacts the abutment structure to maintain the dashboard in the desired location.

8 Claims, 3 Drawing Sheets

DASHBOARD ASSEMBLY FOR CHILDREN'S RIDE-ON-VEHICLE

BACKGROUND OF THE INVENTION

This invention relates to children's ride-on vehicles, and specifically, to a dashboard assembly for such a vehicle.

A variety of children's ride-on vehicles are known. One such vehicle is disclosed in my prior issued U.S. Pat. No. 4,709,958, issued Dec. 1, 1987, for a RIDABLE VEHICLE AND ASSEMBLY METHOD. The vehicle disclosed in the '958 patent is a fairly large structure and the body thereof is formed in sections, preferably by injection molding. The sections are joined together to form the complete vehicle. Such a construction is desireable for large vehicle in that the problems associated with injection molding a one-piece body for a large vehicle do not result in a cost-effective production mehtod. A body which is formed in multiple sections also allows the integral formation of auxiliary body parts on a single component of the vehicle.

In the case of small body vehicles, it is desireable to form the body as a single molded unit, thereby reducing assembly time and simplifying the molding process. However, with a single body piece, it is not possible to form many of the details in the mold and then subsequently to remove the body from the mold after formation. Particularly, it is not economically feasible to construct a mold in which a dashboard assembly is formed with the body because the dashboard assembly generally projects rearward over what is referred as the floor pan area of the vehicle, into which the riders feet are placed during vehicle operation.

SUMMARY OF THE INVENTION

An object of the invention is to provide a dashboard assembly which facilitates unitary vehicle-body construction for a children's ride-on vehicle.

A further object of the invention is to provide a dashboard assembly which facilitates simple assembly of a dashboard structure and a unitary vehicle body.

Another object of the invention is to provide a dashboard assembly which maintains the dashboard in a desired location relative to the vehicle body.

The dashboard assembly of the invention is provided to allow unitary vehicle body construction and to provide a dashboard which extends rearward over a floor pan area of the vehicle. The dashboard assembly, or mounting structure, includes a ledge which is integrally formed and recessed in the vehicle body and includes slots formed therein. An abutment structure is provided and surrounds the ledge and the vehicle body. The dashboard structure is constructed to rest on the ledge and has tangs thereon which are receivable in the slots formed in the ledge. An abutment-contacting structure is located on the dashboard structure and contacts the abutment structure on the ledge to maintain the dashboard in the desired location.

These and other objects and advantages of the invention will become more fully apparent as the description which follows is read in conjunction with the drawings.

DETAILED DESCRIPTION OF THE PREFERRED EMBODIMENT

Figure 1:
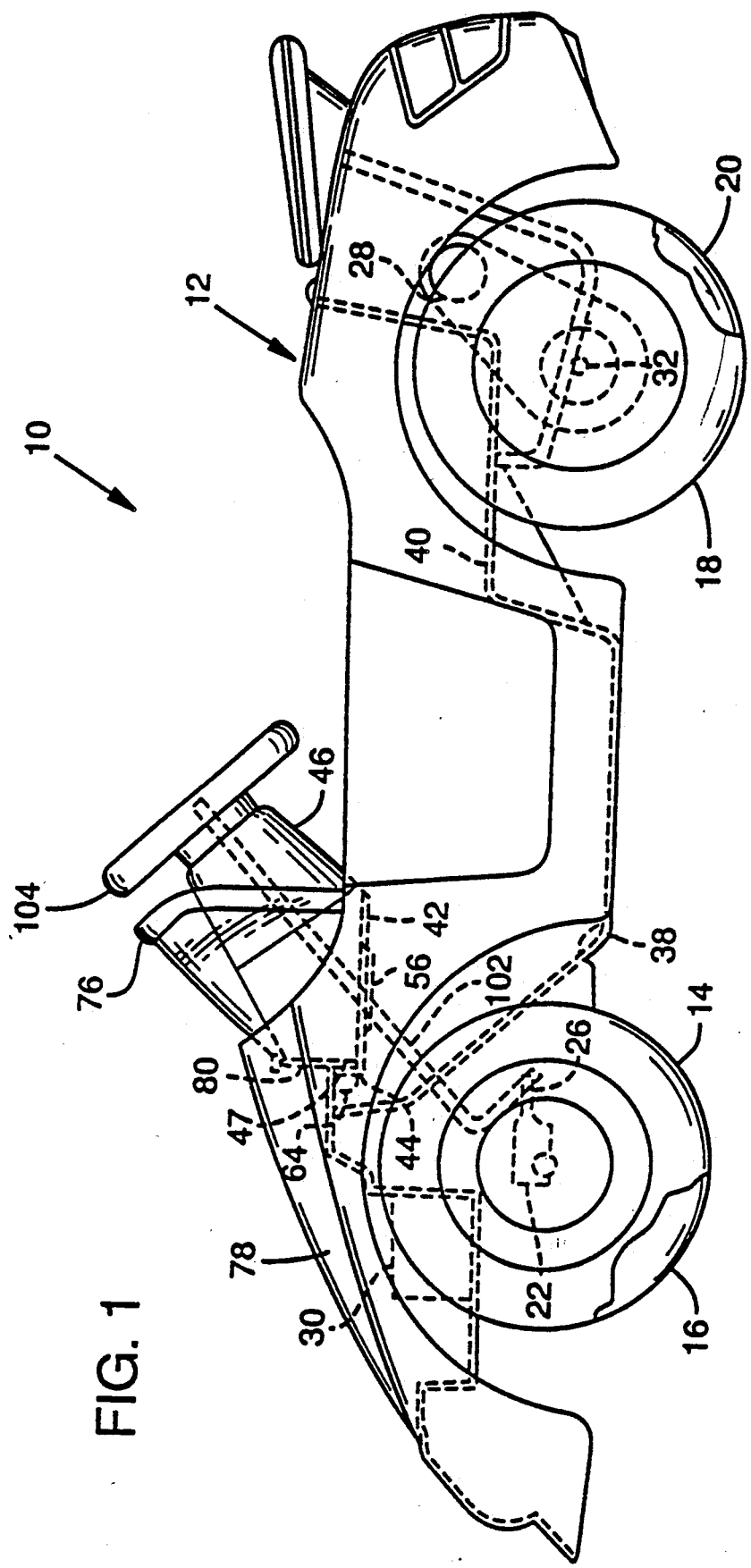
FIG. 1 is a side elevation of a children's ride-on vehicle constructed according to the invention.
Figure 2:
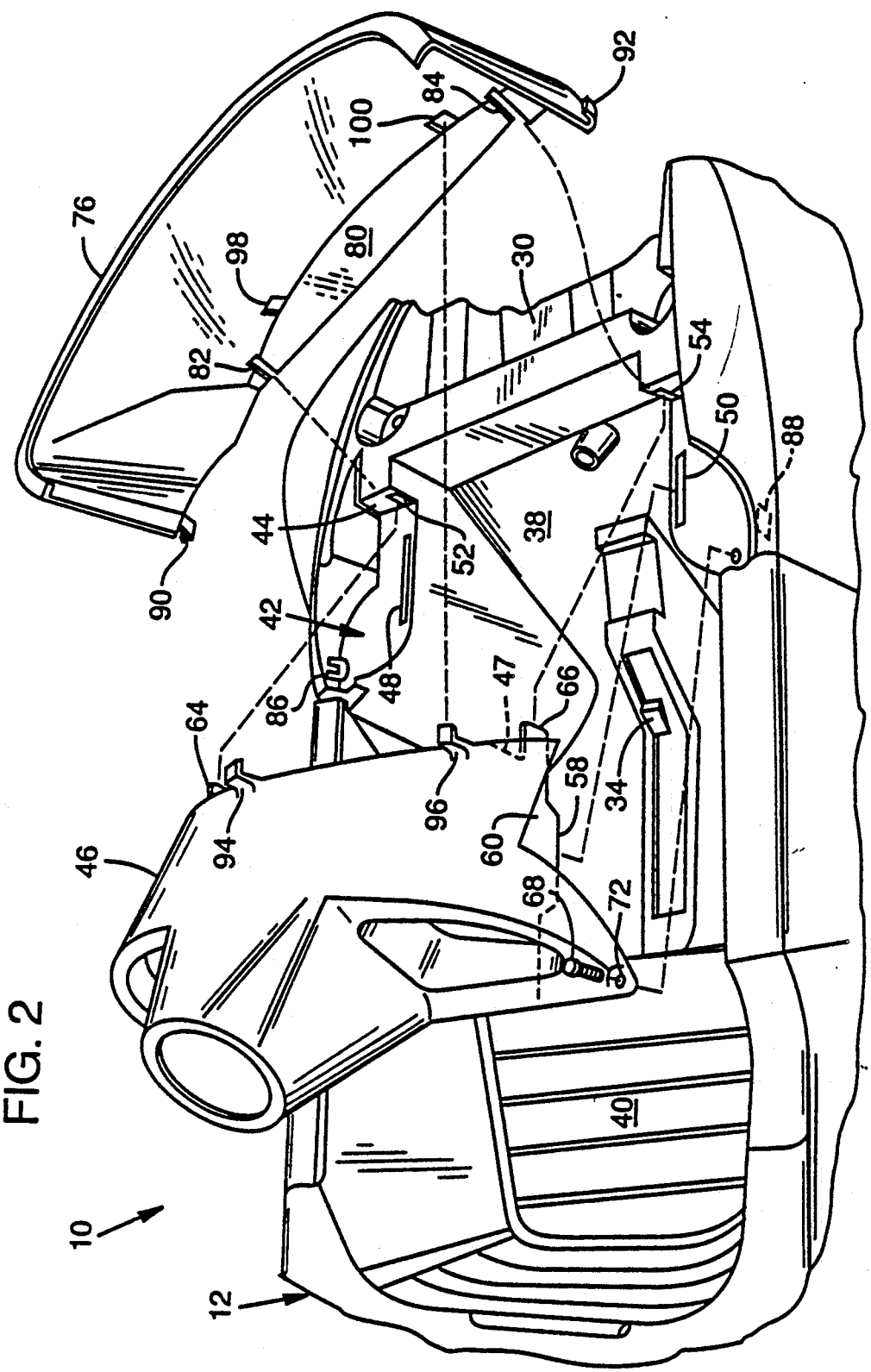
FIG. 2 is an exploded, rear-right quarter perspective view of the vehicle of FIG. 1.
Figure 3:
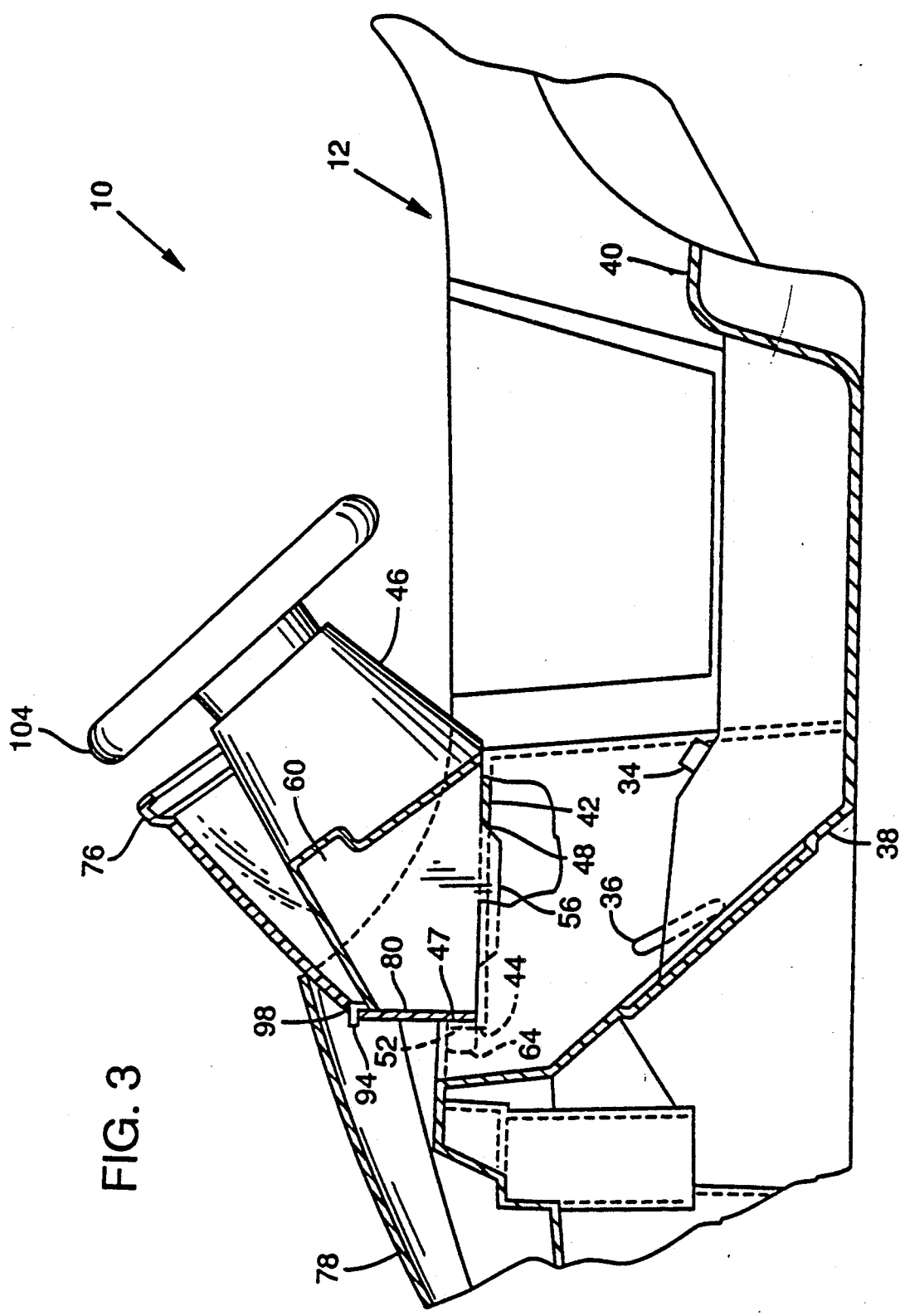
FIG. 3 is an enlarged, partial side elevation of the vehicle of FIG. 1, with portions broken away to show detail.

Turning now to the drawings, a children's ride-on vehicle is shown generally at 10. Vehicle 10 includes a one-piece body 12 which, in the preferred embodiment, is integrally formed as a unitary vehicle body structure. Vehicle 10 includes front wheels 14, 16 and rear wheels 18, 20. Front wheels 14, 16 are steerable and are carried on steerable mounts 22 which are joined together by a tie rod 26.

Vehicle 10 is provided with a drive motor 28 which is powered by a storage battery 30. Drive motor 28 operates on rear axle 32 which carries rear wheels 18 and 20 thereon. Motor 28 is controlled by means of a directional control switch 34 and an accelerator petal 36.

Body 12 includes what is referred to herein as a floor pan area 38, and a seat 40 for the operator to sit on. In the preferred embodiment, floor pan 38 extends forward of seat 40 and provides extensible leg room for a child seated on seat 40.

A ledge 42 is intregrally formed with the vehicle body and recessed therein. Ledge, or ledge means, 42 is sorrounded by an abutment structure 44. Ledge 42 is located at the forward end of floor pan 38 and surrounds the forward end of the floor pan.

A dashboard, or dashboard structure 46 is constructed to rest on ledge 42 and, when so received on ledge 42 projects rearwardly over floor plan 38. An abutment-contacting structure 47 is provided on dashboard structure 46, which is operable to maintain the dashboard structure in a predetermined position relative to ledge 42 through cooperation with abutment structure 44.

Ledge 42, abutment structure 44, dashboard structure 46 and abutment-contacting structure 47 have conformal parts thereof which are designed to secure dashboard structure 46 to body 12. In the preferred embodiment, of a pair of longitudinally extendings slots 48, 50 are formed in ledge 42 on either side thereof above the front end of floor pan 38. Another pair of slots 52, 54 are vertically disposed in abutment structure 44 at the forward edge of ledge 42. Dashboard structure 46 includes tangs, or means, 56, 58, which are formed as downward extensions of support ribs 60 which are integrally formed with dashboard structure 46 in the course of a molding process. Abutment-contacting structure 47 is located on the forward vertical edge of ribs 60. Another pair of tangs 64, 66 project forward from the dashboard abutment-contacting structure 47 and are received in vertical slots 52, 54. The aforementioned slots and tang comprise what are referred to herein as conformal parts.

Dashboard structure 46 is secured to body 12 by means of screws 68, 70 which extend through bores 72 on either side of dashboard structure 46 and then into ledge 42. The arrangement thus far described provides a dashboard structure which may be easily attached to body 12, and which projects rearwardly over floor pan 38. The arrangement of ledge 42 and abutment structure 44 provide a recessed area that contains the dashboard. This arrangement is useful to provide a visual effect that has a streamlined, aerodynamic appearance, which is the norm for prototype motor vehicles. It also provides a smooth transition between the body and the dashboard which is less likely to snag clothing or fingers.

Another feature of vehicle 10 is the provision of a windscreen 76. Windscreen 76 is positioned over dashboard structure 46 such that a vertical portion 80 of the windscreen is received between the dashboard and the body. A pair of slots 82, 84 are formed in vertical portion 80 and are constructed to fit over tangs 64, 66, respectively. A pair of windscreen-receiving slots 86, 88 are formed in ledge 42 and receive tangs 90, 92 formed on the edges of windscreen 76. Tangs 94, 96 are formed on dashboard structure 46 and pass through openings 98, 100 in windscreen 76. Tangs 94, 96 are operable to secure windscreen 76 to dashboard structure 46.

An openable hood 78 is hinged at the forward edge thereof to body 12 and is movable between a down position and an open position, providing for easy opening thereof and access to battery 30, which, in the preferred embodiment, is covered by a simulated internal combustion engine (not shown).

To complete the description of vehicle 10, a steering rod 102 extends upwardly and rearwardly from tie-rod 26, through dashboard structure 46, and is attached to a steering wheel 104. Dashboard structure 46 provides support and proper alignment of steering rod 102 to allow directional control of vehicle 10.

As previously noted, an important consideration of the construction of vehicle 10 is the one-piece body. The vehicle may be partially assembled following manufacture to facilitate rapid final assembly prior to use.

Assembly of the vehicle involves a few simple steps. The battery is installed under the simulated engine. Steering rod 102 is connected to tie rod 26 and dashboard 46 is positioned over the steering rod, with the steering rod projecting upwardly and rearwardly through the center of the dashboard. The tangs on the dashboard are positioned in the conformal slots in the ledge and abutment structure. Dashboard 46 is secured to body 12 with screws 68. Steering wheel 104 is fixed to the free end of steering rod 102. Windscreen 76 is then positioned over the dashboard and fixed in place by inserting tangs 90, 92 into windscreen receiving slots 86, 88 respectively. The remaining parts of the vehicle are then installed.

The completed vehicle is ready to operate once battery 30 is fully charged. Switch 34 is operable to select a forward or reverse direction of movement, while accelerator pedal 36 provides variable power to motor 28. When the operator depresses pedal 36, the vehicle moves. The vehicle stops when pedal 36 is released.

The overall appearance of the vehicle is similar to that of modern prototype vehicles, which are streamlined and convey an aerodynamic impression. The dashboard and windscreen assembly of the invention enhance the prototypical simulation with smooth lines and relatively few protrusions. Lack of protrusions provides a safer vehicle which does not easily snag clothing or fingers.

Thus a children's ride-on vehicle has been disclosed which may be easily manufactured by forming the body as a one-piece structure and a molding operation. The body includes a ledge which receives a separate dashboard thereon, wherein the dashboard is easily secured to the vehicle body. The provision of the separate dashboard enables easy removal of the body from an injection mold and provides a realistic mounting for the dashboard, which projects rearwardly over the floor pan area where a child's feet would be located during operation of the vehicle. Although preferred embodiment of the invention has been disclosed herein, it should be appreciated that variations and modifications may be made thereto without departing from the scope of the invention as defined in the appended claims.

What I claim is:

1. In a children's ride-on vehicle having a unitary vehicle body construction, a floor pan area and a seat, a dashboard mounting structure comprising:
    a ledge integrally formed and recessed in the vehicle body and having at least one pair of slots formed therein;
    an abutment structure surrounding the ledge in the vehicle body; and
    a dashboard structure constructed and arranged to rest on the ledge, having at least one pair of tangs thereon which are constructed to be received in the slots in the ledge, and an abutment-contacting structure which contacts the abutment structure surrounding the ledge to maintain the dashboard in a desired location.

2. The dash board mounting structure of claim 1 wherein the dashboard structure includes multiple ribs integrally formed on the underside thereof and wherein tangs are formed as extensions of the ribs.

3. A children's ride-on vehicle comprising:
    a vechicle body, formed as a unitary, molded structure, having a floor pan area, a seat, and a ledge constructed to receive a dashboard thereon, the ledge having a plural paired slots formed therein; the body further having an abutment structure formed therein which surrounds the ledge; and
    a dashboard, formed as a unitary molded structure and constructed to rest on the ledge, having plural ribs located on the underside thereof, wherein certain of the ribs have extensions which extend outwardly therefrom, the extensions being received in a cooperating slot in the ledge, the dashboard including an abutment-contacting structure which contacts the abutment structure of the body to maintain the dashboard in a desired location on the ledge.

4. The children's ride-on vehicle of claim 3 which further includes a vehicle windscreen received on the ledge and located between the ledge and the dashboard.

5. The children's ride-on vehicle of claim 4 which further includes an openable hood which is hinged to the body adjacent the front of the hood.

6. The children's ride-on vehicle of claim 5 wherein the ledge includes a pair of windscreen securing slots therein and wherein the the windscreen includes a pair of tangs which cooperate with the windscreen securing slots to secure the windscreen to the vehicle.

7. A children's ride-on vehicle comprising:
    a vehicle body, having a seat, a floor pan region extending forward of the seat and constructed to provide extensible leg room for a child seated on the seat, and means for accommodating a dashboard located ahead of the floor pan region, the means for accommodating including a ledge which includes slots therein and an abutment structure which surrounds the ledge, the vehicle body being constructed as a unitary structure in a molding process; and
    a dashboard which is received on the ledge and which projects, when so received, rearwardly over the floor pan region, and which includes support ribs therein, the ribs having tangs extending therefrom which are cooperatively received in the slots on the ledge, the dashboard further having abutment-contacting structures which contacts the abutment structure to maintain the dashboard in a predetermined location.

8. The children's ride-on vehicle of claim 7 which further includes a windscreen, tang means located on the dashboard along the leading edge thereof, and tang means receivers in the windshield for receiving the tang means of the dashboard for securing the windscreen to the dashboard.

* * * * *